Sept. 22, 1942.   D. F. WINNEK   2,296,804
EMBOSSING SHEETS OF CELLULOSE ACETATE AND THE LIKE
Filed Sept. 18, 1940
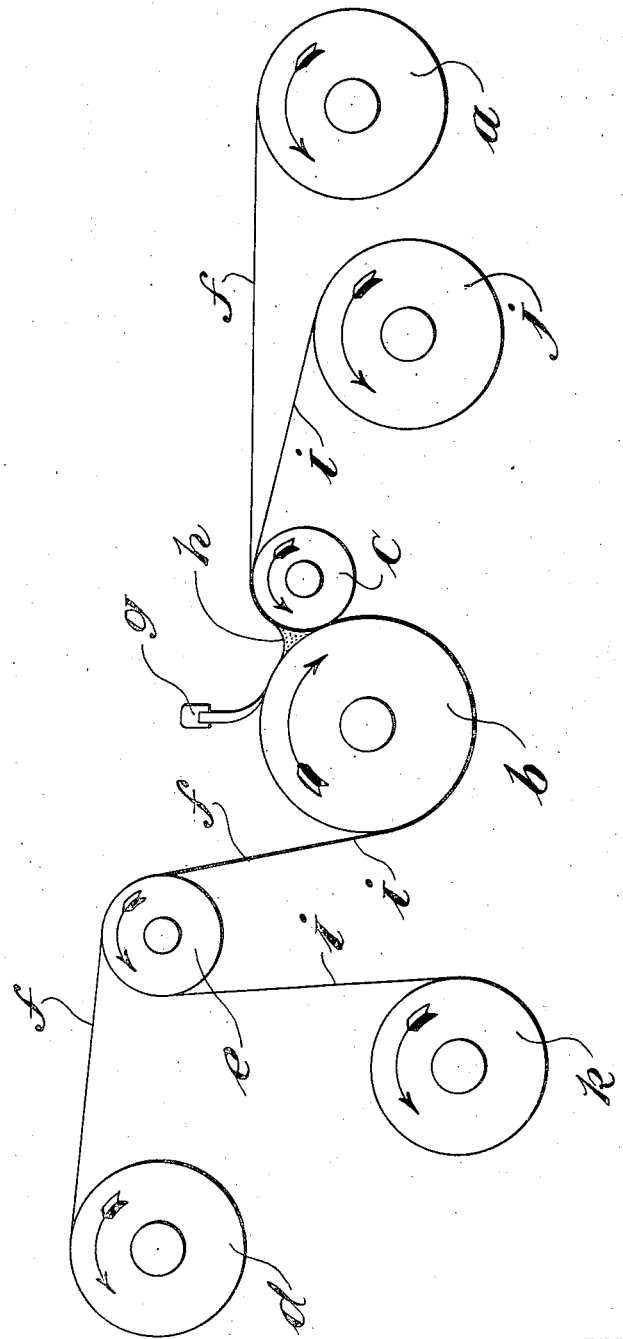
INVENTOR
Douglas F. Winnek
BY
Emery, Varney, Whittemore & Dix
ATTORNEYS Patented Sept. 22, 1942

2,296,804

UNITED STATES PATENT OFFICE 2,296,804

EMBOSSING SHEETS OF CELLULOSE ACETATE AND THE LIKE

Douglas F. Winnek, Rye, N. Y., assignor to Research Corporation, New York, N. Y., a corporation of New York Application September 18, 1940, Serial No. 357,207

11 Claims. (Cl. 18—56)

My thermo-plastic method of lenticulating sheets of cellulose acetate and like material for use in stereo-photography, which method is the subject of my patent application Serial No. 199,738 filed April 2, 1938, may be applied to both emulsion-coated photographic film and to uncoated sheets of film; but since its use in the former case might seriously affect some photographic emulsions such, for example, as those used for panchromatic and infra red coatings, I prefer in such a case to use what I call my solvent method of lenticulating film and which is the subject of the present invention.

It is well known, of course, that there are a number of solvents, as acetone for example, that will soften a sheet of film material such as cellulose acetate, to a degree where it will take the impression of a matrix. But practical difficulties arise in applying such a procedure to the formation of lens-ridges in a photographic film. The reason for one of these difficulties is that the lens-ridges must be as nearly optically perfect as possible; and this, in turn, requires not only perfection in the shape or contour of the ridges themselves but the maintenance of a constant ratio between their width and the thickness of the film. For the use of lenticular film in stereo-photography depends largely for its success upon having the optical properties of the film closely approximate the optical theory upon which such use is based.

Another reason is that since a method of this kind, to be practicable for commercial use, must be capable of fairly rapid operation, the solvent, if copiously applied for quick softening and uniform and thorough coverage of all parts of the film, tends to delay the dying and setting of the film after the impression; and substantial setting or hardening must occur before the still moist film can safely be removed from the matrix.

With these considerations in view, I have devised and am successfully practicing a method which I have illustrated diagrammatically in the single figure of the accompanying drawing, wherein $a$ denotes a roll of film to be processed by my invention, $b$ the matrix roll which may be similar to the matrix roll shown and described in my aforesaid patent application, $c$ a counter or pressure roll therefor of medium-hard rubber, $d$ a wind-up roll, and $e$ a guide roll which is adjustable to control the amount of lap of the film on the matrix roll. The strip of film $f$ passes from the roll $a$ to and between the pressure and matrix rolls, then over the guide roll $e$ and to the wind-up roll. It will be understood that means (not shown) are provided to drive the matrix and pressure rolls and the wind-up roll and to keep the film fairly taut between the pressure roll and wind-up roll.

I apply the solvent (acetone, for example) copiously to one side of the film—to the uncoated side if a coated film is being processed in which case the uncoated side will preferably face upwardly as the film passes from the roll $a$ to the matrix roll. The application of the solvent may be effected in several ways; but I prefer, as I show here, to apply it directly to the matrix roll with a moistening brush $g$ of absorbent material and so positioned in relation to said roll that the solvent oozing out of the brush will run downwardly along that roll to form a pool $h$ in the space between it and the pressure roll and directly above their contact zone. Thus, by keeping the brush moderately saturated with the solvent, there will be a constant pool of that liquid in the space denoted by $h$; and this will result in supplying a constant excess thereof to the sheet for softening the same and will insure its uniform application over the entire side of the sheet presented to the solvent. This excess of solvent, together with its direct application to the matrix roll, will tend to secure a very quick softening of that side of the sheet. By giving the brush a to-and-fro movement so as to rub it across the matrix roll, the latter may be kept free of dust and other foreign particles which, otherwise, would be likely to lodge in the matrix and interfere with the proper formation of the lens ridges in the sheet.

By proceeding in the foregoing manner, the contour of the ridges formed in the sheet will be accurate and free from blemishes throughout all parts of the sheet; and since the thus softened sheet will take the complete impression of the matrix within a variable range of pressure, this permits the pressure to be adjusted (between the pressure and matrix rolls) for any given thickness of sheet to be processed so that the desired ratio between the ultimate thickness of the sheet or film and the width of the ridges may be constantly maintained.

For quick drying and setting, I have discovered that by providing means to absorb the free solvent which is carried along with the sheet or has been squeezed out of the sheet during the impression, the solvent which remains in the sheet will very quickly dry out, so much so that the embossed sheet or film, though still moist, will set sufficiently so that it may be safely removed from the matrix roll in less than a minute, and even more quickly if a current of air is applied to the embossed sheet. These means may consist of a web of absorbent material, such as paper, denoted at $i$, supplied from a roll $j$ and carried around with the sheet along its underside to a wind-up roll $k$. This web is kept under tension and hence also serves to prevent the embossed sheet from warping while still in the matrix. Such warping would otherwise tend to occur, since the sheet, despite the application of the solvent thereto, is still stiff and resilient; and hence if it were held to the matrix roll by its own tension alone, the tendency would be for it to separate from the matrix roll in one or more places before the embossed ridges are sufficiently set or hardened. The web $i$, when used, insures against this.

The rate at which the sheet may be passed over the matrix roll, and therefore the speed of operation, depends upon the size of the matrix roll and the amount of the sheet lap thereon. I prefer to have this lap as much as 180° or more; and the matrix roll may be made as large as is consistent with the expense of engraving it. By using the solvent in excess and then compensating for this excess use by reabsorbing the solvent as I have just explained, the setting or hardening time of the sheet or film may be reduced to about 30 seconds or less; so that by using a comparatively small matrix roll, say about 1 foot in diameter, I can produce lenticulated film by my present method at the rate of about 6 feet or more per minute.

When my invention is used to process photographic film containing colored screen-elements disposed between the film and photographic emulsion (a well known type of film used in color photography), the solvent in my process generally reaches and penetrates to these screen-elements on the emulsion side of the film; and I have found that the solvent, during the process, acts upon these screen-elements to increase substantially the brilliancy of their colors and otherwise to enhance and improve their coloring effect in the developed image. I have noted particularly that the yellows of the image may be very greatly improved in this way. So far as the emulsion itself is concerned, the solvent appears to have no effect upon it whatever.

It will be understood, of course, that I may treat uncoated sheets as well as coated photographic film by the method of my invention.

I claim as my invention:

1. A method of lenticulating a sheet of cellulose acetate or like material, comprising applying a softening liquid to one side of the sheet, impressing the sheet with a matrix, positively removing the free liquid from the sheet after the impression, and allowing the sheet to remain in the matrix until set.

2. A method of lenticulating a sheet of cellulose acetate or the like, comprising applying to said sheet an amount of softening liquid in excess of that required to soften one side thereof, immediately impressing that side of the sheet with a matrix, removing the liquid squeezed out of the sheet by the impression, and allowing the sheet to remain in the matrix until hardened beyond deformation.

3. A method of lenticulating a sheet of cellulose acetate, comprising applying acetone to one side of the sheet, impressing that side of the sheet with a matrix, positively removing the free acetone from the sheet after the impression, and allowing the sheet to remain in the matrix until set.

4. A method of lenticulating photographic film having a base of cellulose acetate coated on one side, comprising applying acetone to the uncoated side thereof, impressing the uncoated side with a matrix, positively removing the free acetone from the film after the impression, and allowing the embossed film to take a substantial set in the matrix before its removal therefrom.

5. A method of lenticulating a sheet of cellulose acetate or the like, comprising applying a softening liquid in excess to one side of the sheet and also to a matrix, impressing the sheet with the matrix, removing the liquid squeezed out of the sheet by the matrix, and allowing the sheet to remain in the matrix until set.

6. A method of lenticulating a sheet of cellulose acetate or like material with a matrix roll, comprising rubbing the matrix roll with a brush moderately saturated with a softening liquid for the sheet so that the liquid oozing from the brush will run along the roll to the sheet just before the impression is taken, taking the impression, positively removing the free liquid from the sheet after taking the impression, and allowing the embossed sheet to remain in the matrix roll until set.

7. A method of molding lens-ridges in a sheet of cellulose acetate or like material, comprising passing the sheet around a matrix roll having a counter roll and through a pool of softening liquid contained in the space between and directly above the contact zone of the two rolls, whereby both the matrix and sheet contact with said liquid before the impression is taken, and thereafter allowing the embossed sheet to set before removing it from the matrix roll.

8. A method of molding lens-ridges in a sheet of cellulose acetate or like material, comprising passing the sheet around a matrix roll having a counter roll and through a pool of softening liquid contained in the space between and directly above the contact zone of the two rolls, whereby both the matrix and sheet contact with said liquid before the impression is taken, removing the excess liquid absorbed by the sheet and squeezed out of the sheet by the matrix, and allowing the sheet to set substantially before removing it from the matrix.

9. A method of molding lens-ridges in a sheet of cellulose acetate or like material, comprising passing the sheet together with a web of absorbent material around a matrix roll provided with a counter roll and through a pool of softening liquid contained in the space between and directly above the contact zone of said rolls, and allowing the sheet to set substantially before removing it from the matrix.

10. A method of molding lens-ridges in a sheet of cellulose acetate or like material, comprising passing the sheet together with a web of paper around a matrix roll provided with a counter roll and through a pool of softening liquid contained in the space between and directly above the contact zone of said rolls, and allowing the sheet to set substantially before removing it from the matrix.

11. A method of molding lens-ridges in a sheet of cellulose acetate or like material, comprising passing the sheet around a matrix roll provided with a counter roll and through a pool of softening liquid contained in the space between and directly above the contact zone of the two rolls and thereafter holding the sheet uniformly in contact with the matrix roll by a retaining web until the embossed sheet has substantially set.

DOUGLAS F. WINNEK.